United States Patent [19]

Langerbeins et al.

[11] Patent Number: 4,966,877

[45] Date of Patent: Oct. 30, 1990

[54] METHOD FOR MAKING HETEROPOLYACID CATALYSTS AND CATALYSTS MADE BY THE METHOD

[75] Inventors: Klaus Langerbeins, Langen; Wilhelm Gruber, Darmstadt, both of Fed. Rep. of Germany

[73] Assignee: Röhm GmbH, Darmstadt, Fed. Rep. of Germany

[21] Appl. No.: 480,328

[22] Filed: Feb. 12, 1990

Related U.S. Application Data

[63] Continuation of Ser. No. 358,698, May 26, 1989, abandoned, which is a continuation of Ser. No. 171,567, Mar. 22, 1988, abandoned.

[30] Foreign Application Priority Data

Mar. 31, 1987 [DE] Fed. Rep. of Germany ....... 3710784

[51] Int. Cl.$^5$ .................... B01J 27/16; B01J 27/19; B01J 27/199
[52] U.S. Cl. ............................................. 502/209
[58] Field of Search ............................... 502/209, 211

[56] References Cited

U.S. PATENT DOCUMENTS

| | | | |
|---|---|---|---|
| 4,092,269 | 5/1978 | Mount et al. | 252/435 |
| 4,146,574 | 3/1979 | Onoda et al. | 423/299 |
| 4,499,202 | 2/1985 | Arias et al. | 502/211 |
| 4,522,934 | 6/1985 | Shum et al. | 502/209 |
| 4,530,916 | 7/1985 | Matsumoto et al. | 502/209 |
| 4,632,914 | 12/1986 | Arias et al. | 502/211 |
| 4,670,132 | 6/1987 | Arias et al. | 208/111 |

FOREIGN PATENT DOCUMENTS

| | | |
|---|---|---|
| 0024954 | 3/1981 | European Pat. Off. . |
| 0079491 | 5/1983 | European Pat. Off. . |
| 0113084 | 12/1983 | European Pat. Off. . |
| 2145049 | 3/1973 | Fed. Rep. of Germany . |
| 2722375 | 12/1977 | Fed. Rep. of Germany . |
| 3314192 | 12/1983 | Fed. Rep. of Germany . |
| 1261073 | 4/1961 | France . |
| 2040546 | 1/1971 | France . |
| 1331423 | 9/1973 | United Kingdom . |
| 1523849 | 9/1978 | United Kingdom . |

OTHER PUBLICATIONS

Inorg. Chem. 7 (1968) 437–441.
Ullmann's Encyclopaedie der technischen Chemie, 4th Edn, vol. 13, pp. 563–564.

*Primary Examiner*—W. J. Shine
*Attorney, Agent, or Firm*—Curtis, Morris & Safford

[57] ABSTRACT

Catalysts having an improved long-term activity behavior in the oxydehydrogenation of, for example, isobutyric acid to methacrylic acid, are prepared from heteropolyacids of molybdenum or from their metal salt derivatives by the concurrent use of a water soluble organic compound which is of low volatility or is practically non-volatile, such as a polymer, followed by calcination of the preparation at 200° C. to 400° C. in the presence of oxygen.

4 Claims, 4 Drawing Sheets

METHOD FOR MAKING HETEROPOLYACID CATALYSTS AND CATALYSTS MADE BY THE METHOD

This is a continuation of application Ser. No. 071,358,698, filed May 26, 1989, now abandoned which in turn is a continuation of application Ser. No. 07/171,567 filed Mar. 22, 1988 and now abandoned.

The present invention relates to methods for making an oxidation catalyst comprising a heteropolyacid of molybdenum, to catalysts so made, and to the use of such catalysts.

Such heteropolyacids and their metal salts are known as selectively acting catalysts in oxydehydrogenation reactions, for example in the oxidative dehydrogenation of isobutyric acid to methacrylic acid.

Phosphomolybic acid (12-molybdophosphoric acid, $H_3PMo_{12}O_{24}$, and particularly its vanadium derivatives, that is molybdovanadophosphoric acids of the formula $H_{3+x}PMo_{12-x}V_xO_{40}$, wherein x=1,2, or 3, are known as heteropolyacid catalysts for carrying out selective oxidations, including the oxydehydrogenation of isobutyric acid or its esters to methacrylic acid or its esters. The preparation of such heteropolyacids is described in Inorg. Chem. 7 (1968), 437–441, for example, or in U.S. Pat. No. 4,146,574. For use as catalysts in vapor phase oxidations, the heteropolyacids, also in the form of salts or metal derivatives, are advantageously formed into manageable shapes together with an inert inorganic support material, such as silica or alumina, which possesses internal surfaces and porosities adapted for specific uses.

Catalysts of this type and their uses, such as in particular the oxidative dehydrogenation of isobutyric acid to methacrylic acid, are described in German patent publication 27 22 375 and European Pat. publication No. 0 113 084. However, catalysts containing $H_5PMo_{10}V_2O_{40}$ or $Cu_{0.2}PMo_{10}VO_{35.2}$, for example, which have been prepared by prior art methods exhibit a serious drawback in use: namely they become deactivated relatively quickly, which means that their service life is too short for practical purposes. Deactivated catalysts can be regenerated by the method disclosed in published German Pat. application No. P 36 26 255, for example.

The present invention seeks to improve the activity time behavior of oxidation catalysts comprising heteropolyacids of molybdenum using measures adopted during their preparation. Oxidation catalysts prepared according to the invention are advantageously used for the oxydehydrogenation of isobutyric acid and/or its lower esters to methacrylic acid and/or its lower esters in the vapor phase in the temperature range from 250° C. to 400° C.

It has been found that if a water soluble organic compound which has low volatility or is practically non-volatile is added during the preparation of catalysts from heteropolyacids or their metal salts, optionally together with inert inorganic supports or extenders, followed by drying and calcination of the catalysts, the activity of the novel catalysts so prepared will be preserved for a substantially longer period of time. Prior to calcining, the catalyst mixture may be shaped by tableting, extrusion, or pelletizing, for example.

Thus, the invention relates to a method for making an oxidation catalyst consisting essentially of a heteropolyacid of molybdenum having Mo, P, and V as its principal elements, or metal salts of such acids, by mixing a catalytically active heteropolyacid of this kind, optionally with the addition of an inert inorganic support material, with a water soluble organic compound which is practically non-volatile or of low volatility, the mixture then being dried and calcined, possibly after being formed into shapes, at a temperature from 200° C. to 400° C. in the presence of oxygen. Oligomers and polymers have been found to be particularly suitable water soluble organic compounds.

Figure 1:
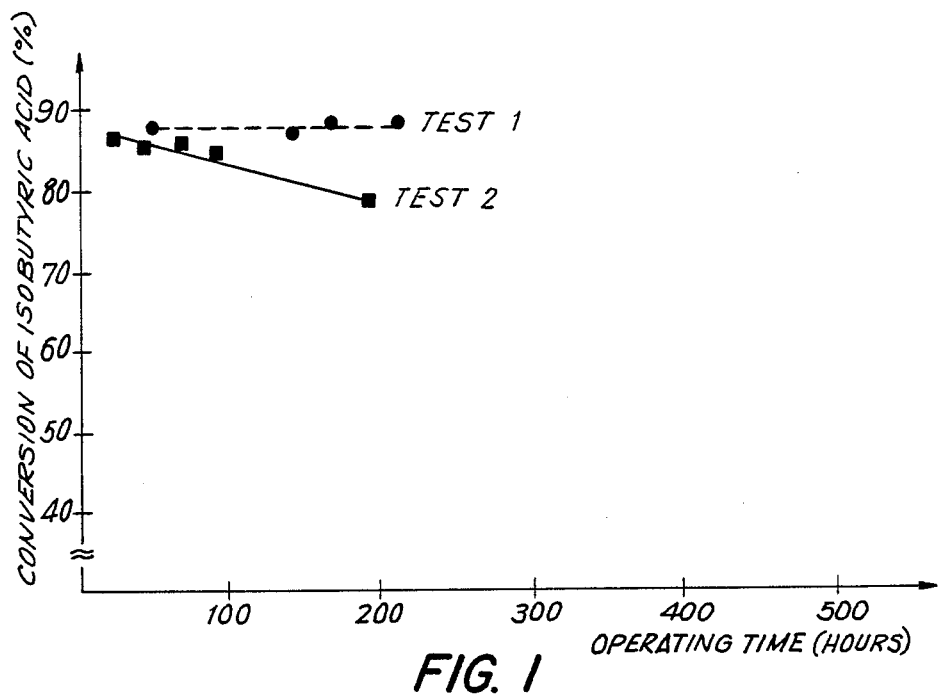
FIG. 1 is a plot comparing a catalyst according to the invention ("Test 1") with a similar catalyst prepared according to the prior art without an organic additive ("Test 2") with respect to their catalystic conversion of isobutyric acid to methacrylic acid as a function of time.

For the production of shaped articles from catalytic material, it is known to add organic materials such as paraffin or stearic acid to improve flow properties in tableting, for example, or to add binders such as glues, starch, rubber, sugar, or alginates for the agglomeration of catalyst particles in granulation on a pan granulator, for example. However, in contrast to the method of the invention, the additives used to shape the catalyst precursors in the prior art have no effect on the catalytic activity of the finished catalyst. (See Ullmanns Encyklopädie der technischen Chemie, 4th edition, vol. 13, pp. 563–564).

Surprisingly, in the use of catalysts prepared according to the invention, for example in the oxydehydrogenation of isobutyric acid, a stabilization of the initial activity is observed in comparison with practically identical catalysts of less stable activity made by prior art methods. Thus, there is no need or less need for regeneration of deactivated catalysts. However, when it does become necesssary to reprocess deactivated catalysts for their regeneration, it is best done in the presence of water soluble organic polymers which will yield catalysts of more stable activity.

The catalysts prepared according to the invention contain an active component (A) which is a phosphorus/molybdenum heteropolyacid, and particularly vanadium derivatives thereof, which can be described by the chemical formula $H_{3+x}PMo_{12-x}V_xO_{40}$, wherein x=0, 1, 2, or 3. Metal salts of these heteropolyacids and/or mixtures of these heteropolyacids, optionally in the form of their metal salts, can also be used as active components. Metal salts of heteropolyacids, and particularly of heteropolyacids containing copper, have proved suitable for the oxydehydrogenation of isobutyric acid or its esters. The cations present in such salts are suitably one of more of the metallic elements Li, Na, K, Rb, Cs, Be, Mg, Ca, Sr, Ba, Zn, Cd, Al, Ce, Ti, Zr, Sn, Sb, Pb, Bi, Cr, Mn, Fe, Co, Ni, Cu, Ag, or As. The salts preferably contain Cu, Cs, Rb, K, Ti, Ce, Mn, Fe, Bi, Cr, or As as the metallic ion, most preferably Cu. Such catalysts are known in the art, for example from European Pat. publications Nos. 79,491 and 113,084.

According to the invention, such an active component (A) is shaped into a vapor phase catalyst in the presence of a water soluble organic compound (B) of low or practically no volatility, for which natural and/or synthetic polymers can be used. Natural polymers suitable for use include such polysaccharides as pectins, starch, dextrins, or proteins and protein hydrolyzates, some of which are water soluble or capable of markedly swelling only at higher temperatures. Suitable synthetic polymers are, in particular, vinyl polymers, for example of acrylic acid, methacrylic acid, maleic acid, maleic acid anhydride, acrylamide or methacrylamide, of copolymers thereof, of N-vinylpyrrolidone and its copolymers, but also addition polymers, such as those of ethylene oxide. The term "polymer" here means both polymeric products consisting of only a few monomer units (a minimum of two), i.e. of oligomers, and those comprising many monomer units and having molecular weights of 10,000, for example, or much higher, up to 100,000 and even 1,000,000, or still higher.

Examples of organic water soluble oligomers are certain dextrins, which are breakdown products of starch, having molecular weights ranging from 1000 to 10,000. Synthetic water soluble oligomers usable for the purposes of the invention are those of ethylene glycol or propylene glycol, such as triethylene glycol, tetraethylene glycol, pentaethylene glycol, and higher oligomers or mixtures thereof, and polypropylene glycols having molecular weight of less than 900. Provided that their water solubility is preserved, the polyalkylene glycols may also be reacted further, for example etherified, at their terminal hydroxyl groups. Oligomeric acrylic and methacrylic acids are well known. Polyacrylic acid and polymethacrylic acid are commercially important products and as such can be used over a wide molecular weight range, for example from 10000 to 1,000,000, as additives in the preparation of catalysts according to the invention.

Polyvinyl alcohol has also been found suitable for use as a water soluble organic polymer in the method of the invention. This polymer is obtained by the hydrolysis of polyvinyl esters, for example polyvinyl acetate.

The usable compounds which satisfy the criteria for the practice of the invention include, moreover, pentaerythritol—a tetrafunctional alcohol —, and carboxylic acids such as oleic acid, citric acid, and oxalic acid.

Thus, the compounds which are suitable for use in the method of the invention for the preparation of heteropolymolybdate catalysts having improved activity are organic compounds having sufficient water solubility, that is a water solubility of at least 0.2 g in 100 g of water at 20° C.; which are of low volatility or which are practically non-volatile over a temperature range from about 20° C. to 350° C. (maximum vapor pressure about 400 millibar); and which do not leave a residue at calcining temperatures from 200° C. to 400° C. in the presence of oxygen.

In the method of the invention, the organic water soluble compounds are preferably used in the form of an aqueous solution having a concentration by weight of 0.5 to 60 percent, particularly 1 to 50, and preferably 2 to 40. They are used in amounts from 0.5 to 60 parts by weight per 100 parts by weight of active heteropolyacid compound, particularly from 0.5 to 30 parts per hundred, and preferably from 1 to 10 parts per hundred.

In the preparation of the catalysts, aqueous solutions of the heteropolyacid compounds may be combined with aqueous solutions of the organic compound, or solid heteropolyacid compounds may be added to an aqueous solution of the organic compounds, or a solid water soluble compound of the type described may be added to an aqueous solution or suspension of the heteropolyacid compound and dissolved therein. The aqueous preparations are then concentrated by evaporation, optionally in the presence of an inorganic support material such as silica, silicon carbide, or alumina, which, as described in European Pat. publication No. 0 079 491, may also be present as a prefabricated shaped support. The resulting product is then dried further at a temperature from about 100° C. to 150° C. and calcined in the temperature range from 150° C. to 400° C., and more particularly from 200° C. to 400° C., and preferably from 250° C. to 350° C., in the presence of oxygen. Forming may also be carried out by prior art methods after the catalytic material has been calcined.

The method of the invention is of importance for the preparation of oxidation catalysts used in vapor phase oxidation reactions, for example the oxidation of olefins such as propylene or isobutylene to acrolein or methacrolein, or their further oxidation to acrylic acid or methacrylic acid. Catalysts according to the present invention are of special interest for the oxidative dehydrogenation of isobutyric acid or its esters to methacrylic acid or its esters, which oxidation is advantageously carried out over a catalyst consisting of a heteropolyacid of molybdenum or a salt of such a heteropolyacid. The oxydehydrogenation of isobutyric acid, for example, is carried out over these catalysts at temperatures ranging from about 250° C. to 400° C. in the presence of 1 to 4 moles of oxygen per mole of isobutyric acid, optionally in the presence of an inert gas such as nitrogen, water vapor, or carbon dioxide, inter alia.

A better understanding of the present invention and of its many advantages will be had by referring to the following Examples, given by way of illustration, showing the preparation of heteropllyacid catalysts containing P/Mo/V and having more stable activity in the oxydehydrogenation of isobutyric acid to methacrylic acid.

PREPARATION OF THE CATALYST

EXAMPLE 1

A mixture of 198.31 g of $MoO_3$, 11.39 g of $V_2O_5$, 14.26 g of $H_3PO_4$, 2.0 g of CuO, and 2034 g of distilled water is maintained at boiling temperature for 16 hours with stirring. The solution is then cooled to about 20° C. and, after filtration, is mixed with 6.73 g of a 40 weight percent solution of polyacrylic acid having a molecular weight of 20,000. After 45 minutes, the solution is mixed with 80.07 g of diatomaceous earth and 16 g of silica gel ("Aerosil 200")in a weight ratio of diatomaceous earth to silica gel of 5:1. The mixture is then concentrated by evaporation to form a paste. The latter is then dried and preheated in a circulating air over for 1 hour at 110° C. and for 3 hours at 300° C. in the presence of atmospheric oxygen. The catalyst material so obtained is then cooled and comminuted to a particle size from 2 to 5 millimeters.

EXAMPLES 2 TO 4

By the reaction of $MoO_3$, $V_2O_3$, $H_3PO_4$, and CuO, optionally together with $Cs_2CO_3$, in the molar ratios given in the formulas of following Table 1, solutions of these heteropolyacid compounds are prepared as in Example 1. A water soluble nonvolatile organic compound is added in an amount of 3 parts by weight per 100 parts by weight of active component. Then, as in Example 1, a 70:30 mixture by weight is formed between the active component and diatomaceous earth/silica gel. This mixture is dried to form a paste and is calcined as described in Example 1.

TABLE 1

| Example | Composition of active component | Organic compound added |
|---|---|---|
| 2 | $H_{3.6}Cu_{0.2}PMo_{11}VO_{40}$ | Polyvinyl alcohol (MW 72,000) |
| 3 | $H_{4.6}Cu_{0.2}PMo_{10}V_2O_{40}$ | Polyacrylic acid (MW 15,000) |
| 4 | $H_{3.2}Cs_{0.1}PMo_{11.5}V_{0.5}O_{40}$ | Polyacrylic acid (MW 32,000) |

EXAMPLE 5

A heteropolyacid, $H_5PMo_{10}V_2O_{40}$, containing water of crystallization and prepared according to U.S. Pat. No. 4,146,574 is pelletized in powder form in a solution of 5 parts by weight of polyvinylpyrrolidone ("Kollidon 25") in a mixture of 55 parts by weight of water and 40 parts by weight of isopropanol. (See Ullmans Encyclopadie der technischen Chemie, 4th edition, vol. 2, pp. 321–327). In the process, 5 g of polyvinylpyrrolidone are added per 100 g of $H_5PMo_{10}V_2O_{40}$. The pellets, which have an average diameter of 3.5 millimeters, are dried for 21 hours at 110° C. and then for 2 hours at 150° C., and are then calcined for 4 hours at 310° C. in the presence of atmospheric oxygen.

EXAMPLE 6

A $Cs_2Mo_{12}V_{1.5}P_2O_{45.8}$ catalyst free of diatomaceous earth/silica gel is prepared according to Example 1 of U.S. 4,370,490 omitting the calcination step there indicated. 5 g of polyvinylpyrrolidone ("Kollidon 25") are added in the form of a 20 percent by weight aqueous solution to 100 g of the catalyst powder and the whole is mixed thoroughly, dried, and calcined for 5 hours at 320° C. in the presence of atmospheric oxygen.

CATALYST TESTS IN THE OXYDEHYDROGENATION OF ISOBUTYRIC ACID

Figure 2:
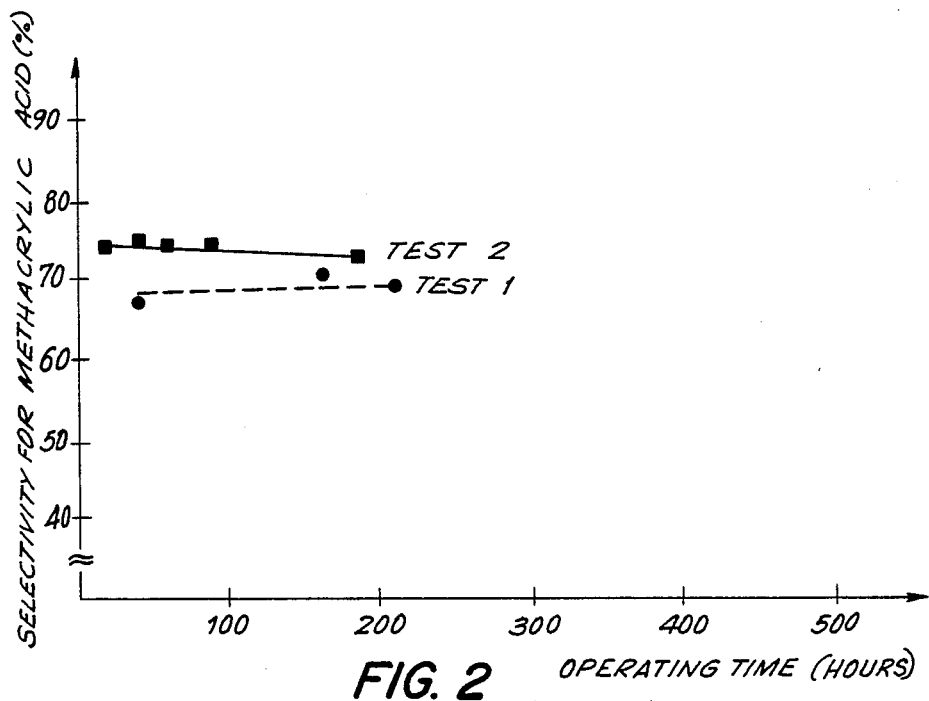
FIG. 2 is a plot comparing the same two catalysts with respect to their selectivity for the methacrylic acid product.
Figure 3:
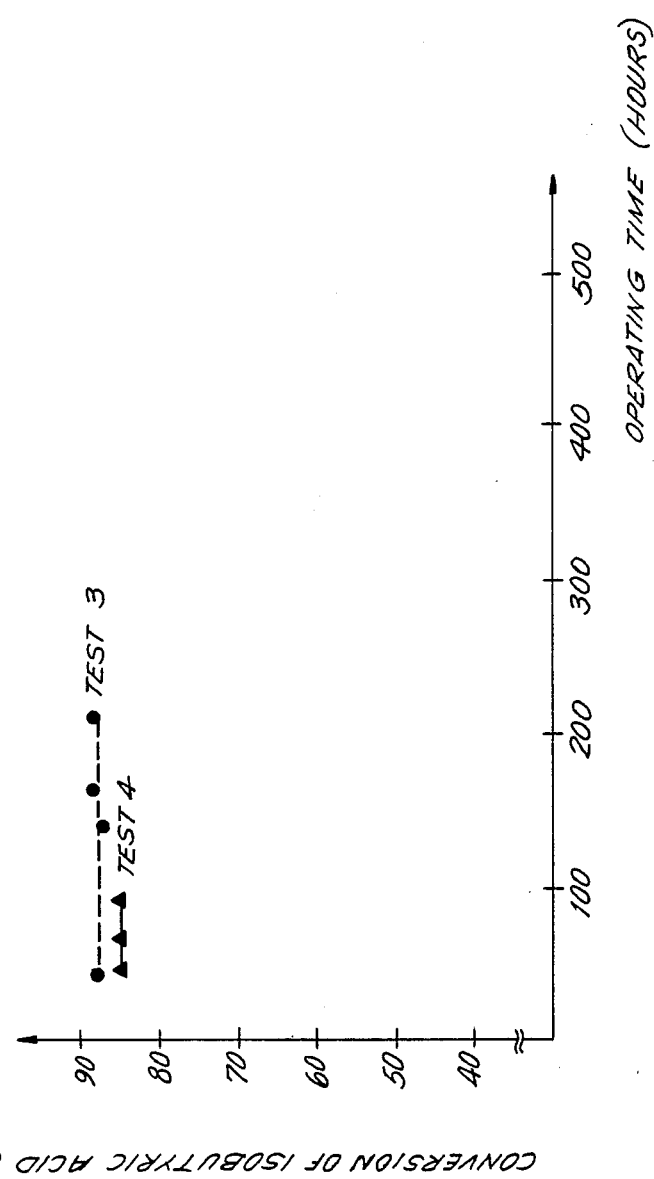
FIG. 3 is a plot of conversion of isobutyric acid as a function of time for the same two catalysts employed in FIGS. 1 and 2.
Figure 4:
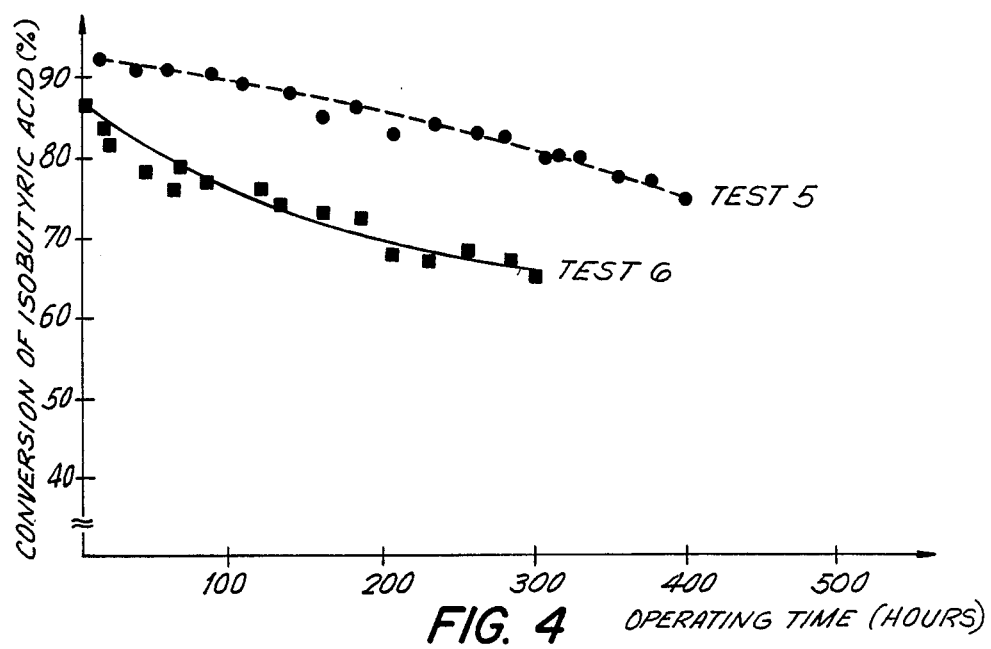
FIG. 4 is a plot comparing a further catalyst according to the invention ("Test 5") with a similar prior art catalyst prepared without an organic additive ("Test 6") with respect to their catalytic conversion of isobutyric acid to methacrylic acid as a function of time.
Figure 5:
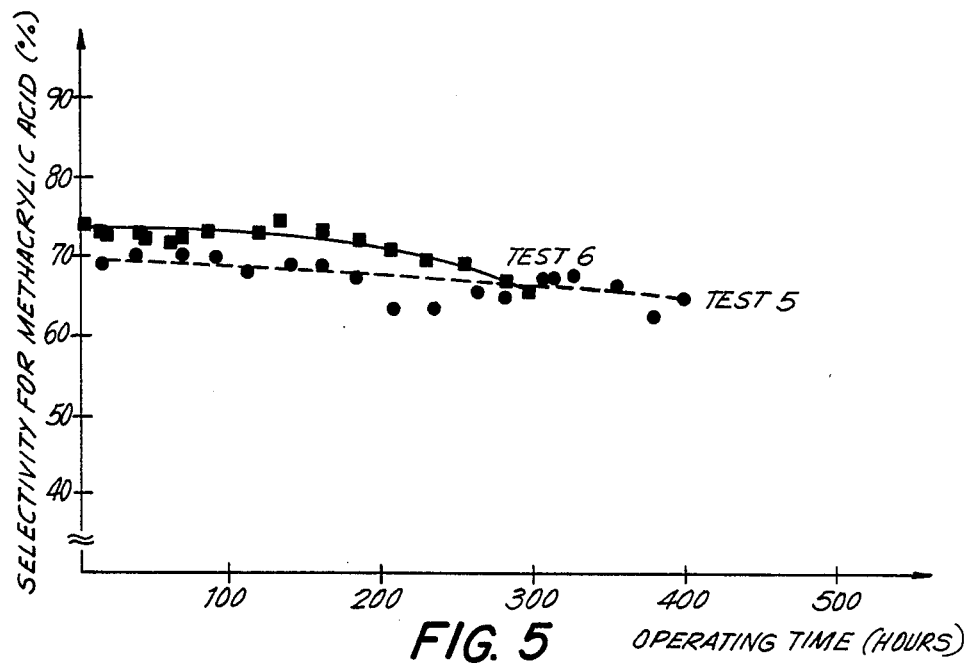
FIG. 5 is a plot comparing these same two catalysts with respect to their selectivity for methacrylic acid.
Figure 6:
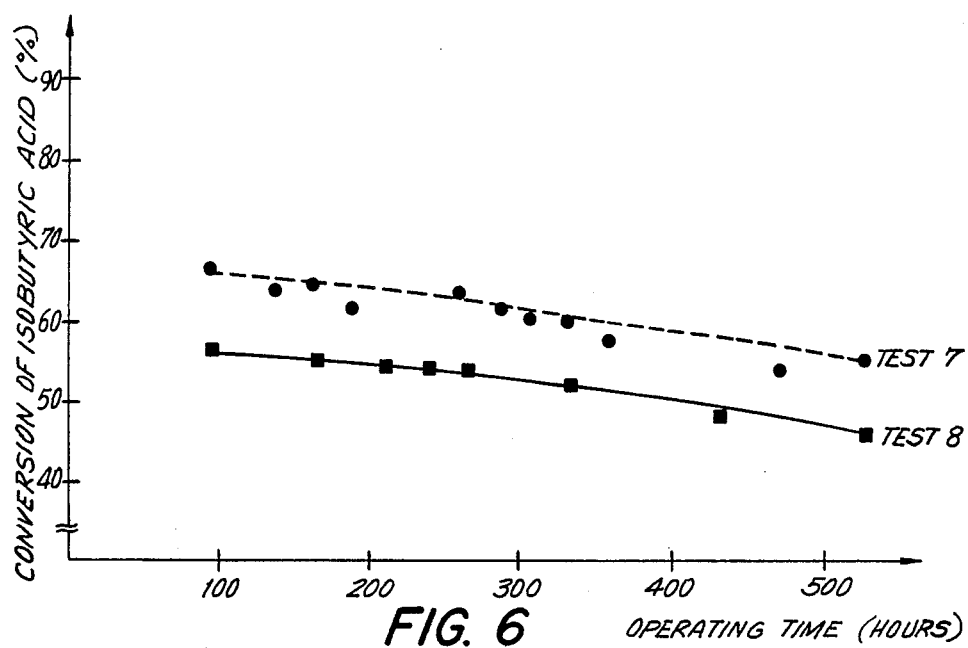
FIG. 6 is a further plot comparing a still different catalyst according to the invention ("Test 7") with a similar prior art catalyst prepared without an organic additive ("Test 8")
Figure 7:
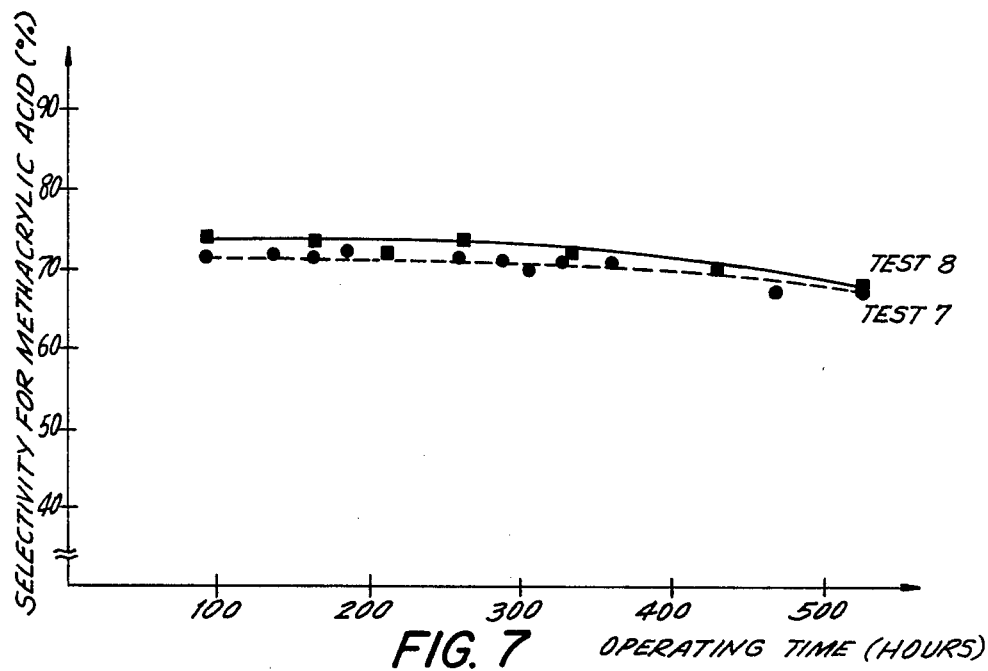
FIG. 7 is a plot comparing these same two catalysts with respect to their selectivity for methacrylic acid.

In each case, a vaporous mixture of isobutyric acid and oxygen (as air) in a molar ratio of 1:1.5, sometimes together with nitrogen in an amount of 2 moles per mole of isobutyric acid, is reacted in a circulating reactor over a catalyst and under the conditions given in following Table 2. The reaction gas is continuously analyzed by gas chromatography and the conversion of isobutyric acid and the selectivity of the catalyst for methacrylic acid are calculated from the values obtained. These measures of catalytic activity are plotted in accompanying FIGS. 1–7.

TABLE 2

| Test | Catalyst (catalytically active component) | Temperature °C. | IBA feed (g of IBA per 1,000 g of active component and hour) | Result plotted in FIG. |
|---|---|---|---|---|
| 1 | $H_{3.6}Cu_{0.2}PMo_{11}VO_{40}$ | 340 | 1,250 plus $N_2$ | 1 and 2 |
| 2 (Comp.) | As above As in Ex. 1 but without polyacrylic acid | 340 | 1,250 plus $N_2$ | 1 and 2 |
| 3 | As above As in Example 1 | 340 | 1,250 plus $N_2$ | 3 |
| 4 | As above As in Example 2 | 340 | 1,250 plus $N_2$ | 3 |
| 5 | $H_{4.6}Cu_{0.2}PMo_{10}V_2O_{40}$ As in Example 3 | 340 | 834 | 4 and 5 |
| 6 (Comp.) | As above As in Example 3 but without polyacrylic acid | 340 | 834 | 4 and 5 |
| 7 | $H_{3.2}Cu_{0.1}Cs_{0.1}PMo_{11.5}V_{11.5}O_{40}$ as in Ex. 4 | 320 | 2,500 | 6 and 7 |
| 8 (Comp.) | As above As in Example 4 but without polyacrylic acid | 320 | 2,500 | 6 and 7 |

TESTS 9 AND 10 (COMPARATIVE)

In keeping with the procedure followed in Tests 1 to 8, the catalyst of Example 5 is tested at a reaction temperature of 340° C. and with an hourly feed of isobutyric acid of 600 g per 1000 g of active component in the presence of 1.5 moles of $O_2$ (as air) plus 2 moles of $N_2$ per mole of isobutyric acid. The result of this test is compared with that of an identical test run with a catalyst containing the same catalytically active component, but produced without the addition of polyvinylpyrrolidone. In the first 100 hours of reaction, both catalysts give isobutyric acid conversions from 82 to 85 percent with selectivities for methacrylic acid of 72 percent. The catalyst prepared according to the invention maintains these activity and selectivity levels for many hundreds of hours, whereas the isobutyric acid conversion of the catalyst made by prior art methods drops steadily and considerably after about 100 hours of reaction and its selectivity for methacrylic acid also declines.

TESTS 11 AND 12 (COMPARATIVE)

A mixture of isobutyric acid/$O_2$ (as air)/$H_2O$ in a molar ratio of 1:1.7:2 is passed over three different 2 milliliter samples of a $Cs_2Mo_{12}V_{1.5}P_2O_{45.8}$ catalyst. The catalyst used in Test 11 was prepared according to the invention: that of Test 12 was made without addition of polyvinylpyrrolidone. Analyses made during the first 50 hours of the tests give the results with respect to activity for isobutyric acid and selectivity for methacrylic acid reported in following Table 3.

TABLE 3

| Test | Temperature °C. | IBA conversion % | Selectivity for methacrylic acid % |
|---|---|---|---|
| 11 | 350 | 99.4 | 63.5 |
|    | 340 | 98.0 | 62.8 |
|    | 330 | 95.3 | 63.0 |
| 12 | 350 | 91.0 | 66.6 |
|    | 340 | 90.1 | 66.1 |
|    | 330 | 77.8 | 65.3 |

What is claimed is:

1. A method for making an oxidation catalyst having improved stability, which method comprises mixing, in water,
   (A) a member selected from the group consisting of catalytically active heteropolyacids of molybdenum of the formula $$H_{3+x}PMo_{12-x}V_xO_{40}$$

wherein x = 1 or 2, and metal salts of such heteropolyacis, and
   (B) a water soluble organic polymer having a molecular weight greater than 10,000, drying the mixture, and then calcining the dried mixture at a temperature from 200° C. to 400° C. in the presence of oxygen.

2. A method as in claim 1 wherein said mixture is formed into shapes prior to calcining.

3. A method as in claim 1 wherein said polymer has a water solubility of at least 0.2 g in 100 g at 20° C. and a vapor pressure not greater than about 400 millibar at a temperature of 350° C.

4. A catalyst made by the method of claim 1.